United States Patent [19]

Marchant et al.

[11] 4,229,322

[45] Oct. 21, 1980

[54] CERAMIC COMPONENT FOR ELECTRODES

[75] Inventors: David D. Marchant; J. Lambert Bates, both of Richland, Wash.

[73] Assignee: The United States of America as represented by the United States Department of Energy, Washington, D.C.

[21] Appl. No.: 961,152

[22] Filed: Nov. 16, 1978

[51] Int. Cl.$^2$ .............................................. F01B 1/06
[52] U.S. Cl. ................................... 252/521; 106/73.2; 310/11
[58] Field of Search ....................... 252/521; 106/73.2; 423/596; 310/11

[56] References Cited

U.S. PATENT DOCUMENTS

| | | | |
|---|---|---|---|
| 3,630,968 | 12/1971 | Hamano et al. | 310/11 |
| 3,686,519 | 8/1972 | Blattman et al. | 310/11 |
| 3,974,108 | 8/1976 | Staut et al. | 310/11 |

OTHER PUBLICATIONS

"The Third US-USSR Colloquium on Magnetohydrodynamic Electrical Power Generation", Moscow, USSR, Oct. 20-21, 1976, p. 419.

*Primary Examiner*—Benjamin R. Padgett
*Assistant Examiner*—J. L. Barr
*Attorney, Agent, or Firm*—James E. Denny; Frank H. Jackson; James W. Weinberger

[57] ABSTRACT

A ceramic component suitable for preparing MHD generator electrodes having the compositional formula: $Y_x(Mg_yCr_z)_wAl_{(1-w)}O_3$ where $x=0.9$ to $1.05$, $y=0.02$ to $0.2$, $z=0.8$ to $1.05$ and $w=1.0$ to $0.5$. The component is resistant to the formation of hydration products in an MHD environment, has good electrical conductivity and exhibits a lower electrochemical corrosion rate than do comparable compositions of lanthanum chromite.

2 Claims, No Drawings

CERAMIC COMPONENT FOR ELECTRODES

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to an electrically conducting material. More specifically, it relates to a ceramic material suitable for preparing electrodes for utilization as current collectors in the channel of a magnetohydrodynamic (MHD) generator.

The environmental conditions within an operating MHD channel are very severe, and strenuous physical demands are placed on electrodes in this environment. The plasma, which is an ionized gas or an inert gas seeded with an ionizing agent such as potassium, may reach temperatures up to 3000 K, while the surface of the electrode may reach about 2000 K. However, since the electrodes are attached to open rectangular frames which are generally of copper, the electrode-frame temperatures can be no more than about 600–1000 K. Thus, the electrodes must be capable of withstanding a temperature differential between electrode-plasma interface and the electrode-frame interface of up to about 1400 K. The electrode must be able to withstand erosive forces from the plasma as it passes through the duct at near sonic velocities. The electrode must either be protected from oxidation or be prepared from oxidation-resistant materials since many plasmas, depending upon the particular fluid and its source, are oxidizing ($P_{O_2} \cong 10^{-3}$ atm.) at operating temperatures. The electrode must also be able to withstand the highly corrosive effects of gaseous or molten potassium and molten coal slag when present in the fluid. The electrodes must be able to withstand the effects of electrochemical reactions which occur due to the passage of direct electric current through the anode and cathode in the presence of an electrolyte, i.e. the potassium seeded coal slag. Finally, the electrode must be constructed of materials which are electrically conductive at the normal operating temperature of the electrode and which can withstand the thermal shock of sudden temperatures changes due to generator malfunction without the electrode separating from the channel or without electrode disintegration. Thus, it is a problem to find materials from which electrodes can be made which can withstand the rigor of such an environment.

Electrodes based on lanthanum chromite (LaCrO$_3$) have long been considered as promising MHD electrode materials for channels operating without coal slag. LaCrO$_3$ based electrodes have successfuly operated in clean-fuel open-cycle MHD test channels for times around 100 hours. However, the material is subject to corrosion by coal slag and alkali metal seed material leading to a loss of CrO$_x$. This loss gives rise to excess La$_2$O$_3$ which is a very hygroscopic oxide. The combination of chromium oxide loss and attack by water on the La$_2$O$_3$ and seed interaction results in changes in volume which may cause a catastrophic mechanical degradation of the electrode material.

The Third US-USSR Colloquium on Magnetohydrodynamic Electrical Power Generation, Moscow, USSR, Oct. 20–21, 1976, page 419, describes work in Russia in which yttrium chromite was doped with calcium and strontium for use as MHD electrodes. Subsequent work on these materials in this country has shown that, while these dopants did increase electrical conductivity of the yttrium chromite, they also increased the vaporization rate of the chromite, to the extent that the material is unsuitable and electrodes prepared of the material would become unusable in an MHD environment containing coal slag or an alkali metal seed within a short period of time.

SUMMARY OF THE INVENTION

A new ceramic material for MHD generator electrodes has been prepared based upon yttrium chromite which has adequate electrical conductivity for MHD electrode application, which is less subject to volatilization and hydration problems of the analogous lanthanum chromite materials which have a low electrochemical corrosion rate. The new material consists in the use of magnesium as a dopant and in the replacement of up to half of the chromium with aluminum. According to the present invention a ceramic component for MHD generator electrodes has the compositional formula:

$$Y_x(Mg_yCr_z)_wAl_{(1-w)}O_3$$

where
x = 0.9 to 1.05,
y = 0.02 to 0.2,
z = 0.8 to 1.05 and w = 1.0 to 0.5.

It is therefore the object of the invention to provide a ceramic component for MHD electrodes which has good electrical conductivity and which is capable of withstanding the environment within an operating MHD channel.

DETAILED DESCRIPTION OF THE PREFERRED EMBODIMENT

In its preferred form the ceramic material for MHD electrodes has the compositional formula:

$$Y_x(Mg_yCr_z)_wAl_{(1-w)}O_3$$

where
x = 1,
y = 0.02 to 0.1,
z = 0.9 to 0.98 and
w = 1.0 to 0.8.

The substitution of magnesium for chromium improves the electrical conductivity of the material. Up to 20%, preferably from 2 to 10%, of the chromium may be replaced by magnesium. Replacement of more than 20% may result in an increased rate of corrosion while under MHD operating conditions.

Up to about 50% of the chromium and magnesium can be replaced with aluminum which in small amounts may help to further improve electrical conductivity of the material, but more importantly, has a depressing effect upon the vaporization rate of the remaining chromium present. More than about 50% aluminum, however, results in an undesirable increase in material resistivity at operating temperatures. The addition of aluminum has the further effect of increasing the thermal expansion coefficient of the material, making it possible to match other lead-in and insulator materials.

Electrodes may be prepared from the ceramic component by any convenient method such as by sintering at high temperatures or by hot-pressing.

EXAMPLE I

A number of different ceramic component compositions of both lanthanum and yttrium were prepared by dissolving appropriate quantities of nitrates of the respective elements, i.e. Y, Mg, Cr and Al, sufficient to make 25 grams of final product in a few ml of water. To the solution was added 60 grams of citric acid and 70 ml of ethylene glycol and the resulting mixture was heated on a hot plate to about 373 k with stirring until nitric fumes are no longer evolved. The resulting polymerized mass was then calcined in air at 1073 to 1273 K to drive off all organic material and five a fine highly sinterable oxide powder. The calcined materials were mixed in a shaker mill using plastic containers and plastic balls. The powders were dry-pressed using ⅛ wt.% polyvinyl alcohol as the binder. The pressed bars were sintered at temperatures between 1773 and 2023 K in atmospheres around $10^{-11}$ atm oxygen. The bars were then oxidized by firing in air at 1773 K. Microexamination of the bars showed a generally closed porosity of about 6 to 8%.

EXAMPLE II

The electrical conductivity of both lanthanum and yttrium chromite were measured using a dc four-point probe technique. No indication of polarization is found which implies that the conductivity is mostly electronic. All the measurements were made in air. Table I below lists the electrical conductivity of four yttrium chromites and a lanthanum chormite. The electrical conductivities of the yttrium chromites change little with temperature. The values are close to those of lanthanum chromite. The values of electrical conductivity are above those required for MHD electrodes ($10^{-2}$ ohm$^{-1}$ cm$^{-1}$). The temperature dependence of the conductivity is also similar to $LaCrO_3$.

TABLE I

| Composition | Temp., K. | $\sigma$(ohm$^{-1}$cm$^{-1}$) |
|---|---|---|
| $YMg_{0.05}Cr_{0.95}O_3$ | 1657 | 1.42 |
| | 1536 | 1.46 |
| | 1450 | 1.31 |
| | 1372 | 1.32 |
| | 1255 | 0.98 |
| | 979 | 0.54 |
| $Y(Mg_{0.05}Cr_{0.95})_{0.75}Al_{0.25}O_3$ | 1527 | 1.36 |
| | 1469 | 1.54 |
| | 1352 | 1.47 |
| | 1283 | 1.39 |
| | 1183 | 1.30 |
| | 312 | 0.009 |
| $YCrO_3$ | 1527 | 0.51 |
| | 1449 | 0.52 |
| | 1335 | 0.49 |
| | 1264 | 0.48 |
| | 920 | 0.33 |
| | 319 | 0.007 |
| $YMg_{0.1}Cr_{0.9}O_3$ | 1549 | 1.65 |
| | 1465 | 1.64 |
| | 1368 | 1.58 |
| | 1269 | 1.48 |
| | 1173 | 1.39 |
| | 875 | 0.94 |
| | 303 | 0.013 |
| $La_{0.95}(Mg_{0.05})CrO_3$ | 1250 | 3.1 |
| | 1111 | 2.7 |
| | 1000 | 2.1 |
| | 893 | 1.1 |

EXAMPLE III

The thermal conductivity was calculated from thermal diffusivity measurements for several chromites and is listed in Table II. Comparison between yttrium and lanthanum show approximately the same thermal conductivity.

TABLE II

| Composition | Temp., K | Thermal Conductivity, W/m−K |
|---|---|---|
| $YMg_{0.05}Cr_{0.95}O_3$ | 1786 | 2.0 |
| | 1581 | 2.2 |
| | 1249 | 2.3 |
| | 556 | 4.8 |
| $YMg_{0.1}Cr_{0.9}O_3$ | 1772 | 2.5 |
| | 1531 | 3.0 |
| | 1263 | 3.2 |
| | 503 | 6.8 |
| $Y(Mg_{0.05}Cr_{0.95})_{9.85}Al_{0.15}O_3$ | 1519 | 1.5 |
| | 1426 | 1.7 |
| | 1265 | 1.7 |
| | 480 | 3.6 |
| $Y(Mg_{0.05}Cr_{0.95})_{0.5}Al_{0.5}O_3$ | 1792 | 1.4 |
| | 1601 | 1.3 |
| | 1234 | 1.5 |
| | 455 | 1.7 |
| $Y_{1.05}Mg_{0.05}Cr_{0.5}Al_{0.5}O_3$ | 1776 | 2.2 |
| | 1522 | 2.3 |
| | 1247 | 2.4 |
| | 537 | 4.4 |
| $Y_{0.95}Mg_{0.05}CrO_3$ | 1957 | 2.3 |
| | 1831 | 2.2 |
| | 1276 | 2.7 |
| | 548 | 4.1 |
| $La_{0.95}Mg_{0.05}CrO_3$ | 1762 | 2.4 |
| | 1511 | 2.4 |
| | 1210 | 2.6 |
| | 491 | 3.7 |
| $La_{0.95}Mg_{0.05}Cr_{0.85}Al_{0.15}O_3$ | 1673 | 2.9 |
| | 1343 | 3.0 |
| | 1118 | 3.0 |
| | 519 | 4.7 |
| $La_{0.95}Mg_{0.05}Cr_{0.5}Al_{0.5}O_3$ | 1741 | 2.3 |
| | 1449 | 2.6 |
| | 1229 | 2.9 |
| | 539 | 3.6 |

EXAMPLE IV

Several electrochemical tests were conducted on both yttrium and lanthanum chromite. The results of two yttrium and five lanthanum tests are given in Table III below. The yttria chromites have a lower electrochemical corrosion rate than the comparable composition of lanthanum chromites. These lower rates indicate that the yttria chromites will endure longer as an MHD electrode than the lanthanum chromites.

Post test analysis also showed that hydration products are not formed from the yttria chromites as found in lanthanum chromite after electrochemical testing. For example, after testing the yttrium chromite in $K_2SO_4$, both the anodes and cathodes were exposed to air for 60 hours with no hydration. With lanthanum chromites the hydration of free lanthanum oxide, formed during the test, occurred within a few hours.

TABLE III

| Test | Compound | Electrolyte | Temp., K | Current Density, A/cm$^2$ | Corrosion, μg/Coulomb Cathode | Anode |
|---|---|---|---|---|---|---|
| 160 | YMg$_{0.05}$Cr$_{0.95}$ | K$_2$SO$_4$ | 1373 | 1.0 | <10 | <10 |
| 158 | YMg$_{0.05}$Cr$_{0.95}$O$_3$ | Illinois#6 + 10 m/o K$_2$O | 1723 | 0.8 | <26 | <26 |
| 167 | Y(Mg$_{0.05}$Cr$_{0.95}$)$_{0.75}$Al$_{0.25}$O$_3$ | Montana Rosebud + 10 m/o K$_2$O | 1723 | 1.0 | 15 | <31 |
| 6 | LaMg$_{0.05}$Cr$_{0.95}$O$_3$ | K$_2$SO$_4$ | 1373 | 1.6 | 315 | 1014 |
| 32 | LaMg$_{0.05}$Cr$_{0.95}$O$_3$ | K$_2$SO$_4$ | 1373 | 1.6 | 652 | — |
| 29 | LaMg$_{0.05}$Cr$_{0.95}$O$_3$ | K$_2$SO$_4$ | 1373 | 1.0 | — | 289 |
|  |  |  |  | 3.0 | — | 1094 |
| 136* | LaMg$_{0.05}$Cr$_{0.95}$O$_3$ | Illinois #6 + 10 m/o K$_2$O | 1723 | 1.0 | 30 | 67 |
| 137 | LaMg$_{0.05}$Cr$_{0.95}$O$_3$ | Montana Rosebud + 10 m/o K$_2$O | 1723 | 1.0 | 164 | <30 |

< = limits of the measurement techinique.
*short time test-material showed signs of gross degradation.

EXAMPLE V

The thermal expansion of several yttrium and lanthanum chromite compositions was measured over a temperature range from 373 to 1673 K. The measurements were made in air. The expansion of the yttria chromites are, in general, less than the corresponding lanthanum chromites. No interactions occurred between the yttria chromites and the alumina push-rod over the range of thermal expansion measurement. Some interaction did occur between the lanthanum chromite and the alumina tube.

TABLE IV

| Composition | Thermal Expansion Coefficient, K$^{-1}$ 373-1673 K, (10$^{-6}$) |
|---|---|
| Y$_{0.95}$Mg$_{0.05}$CrO$_3$ | 7.4 |
| TMg$_{0.05}$Cr$_{0.95}$O$_3$ | 8.7 |
| YMg$_{0.1}$Cr$_{0.9}$O$_3$ | 8.8 |
| YMg$_{0.2}$Cr$_{0.8}$O$_3$ | 8.8 |
| Y(Mg$_{0.05}$Cr$_{0.95}$)$_{0.75}$Al$_{0.25}$O$_3$ | 8.4 |
| Y(Mg$_{0.05}$Cr$_{0.95}$)$_{0.85}$Al$_{0.15}$O$_3$ | 8.8 |
| Y(Mg$_{0.05}$Cr$_{0.95}$)$_{0.5}$Al$_{0.5}$O$_3$ | 8.6 |
| YAlO$_3$ | 8.8 |
| LaMg$_{0.05}$Cr$_{0.95}$O$_3$ | 9.5 |
| La$_{0.95}$Mg$_{0.05}$CrO$_3$ | 8.8 |

As can be seen from the preceding discussion and examples, the ceramic component of this invention is able to provide an electrode for use in an MHD generator environment which provides good electrical conductivity and good resistance to the environment within which it must function.

The embodiments of the invention in which an exclusive property or privilege is claimed are defined as follows:

1. A ceramic component for an MHD generator electrode having the formula:

$$Y_x(Mg_yCr_z)_wAl_{(1-w)}O_3$$

where
x=0.9 to 1.05,
y=0.02 to 0.2,
z=0.8 to 1.05 and
w=1.0 to 0.5.

2. The ceramic component of claim 1 where x=1, y=0.02 to 0.1, z=0.9 to 0.98 and w=1.0 to 0.8.

* * * * *